J. GATES.

LUBRICATOR.

No. 7,663. Reissued May 8, 1877.

Witnesses:
Harry C. Clark
Mannie B. Stallings

Inventor.
John Gates.
by H. W. Beadle & Co.
Attys.

N. PETERS, Photo-Lithographer, Washington, D. C.

UNITED STATES PATENT OFFICE.

JOHN GATES, OF PORTLAND, OREGON.

IMPROVEMENT IN LUBRICATORS.

Specification forming part of Letters Patent No. 107,478, dated September 20, 1870; Reissue No. 7,663, dated May 8, 1877; application filed November 23, 1876.

DIVISION C.

*To all whom it may concern:*

Be it known that I, JOHN GATES, of Portland, county of Multnomah, State of Oregon, have invented new and useful Improvements in Methods of, and Apparatus for, Feeding Oil for Lubricating Purposes, which improvements are fully set forth in the following specification and accompanying drawings.

This invention is designed for feeding oil for lubricating purposes; and it consists mainly, first, in an improved method of feeding, consisting essentially in employing a water-column higher than the body of oil, causing the same to expel, by hydrostatic pressure, the oil from a transparent vessel, and controlling the movement of the column in accordance with observations made of the movement of oil within the vessel; second, in an improved method of feeding, consisting essentially in employing a water-column for expelling, by hydrostatic pressure, the oil, delivering the water to the top of the oil in a transparent vessel, causing the water to pass through the oil in a series of visible drops, and properly controlling the amount admitted; third, in certain means for carrying the first method into effect, consisting essentially in the combination of a transparent oil-reservoir and an eduction-pipe, with an elevated water-induction pipe, having a cock controlling its discharge-opening, and, fourth, in certain means for carrying the second method into effect, consisting essentially in the combination of a transparent oil-reservoir and an eduction-pipe with an elevated water-induction pipe, adapted, by means of a proper cock and discharge end, to deliver the water into the top of the reservoir in drops.

Figure 1:
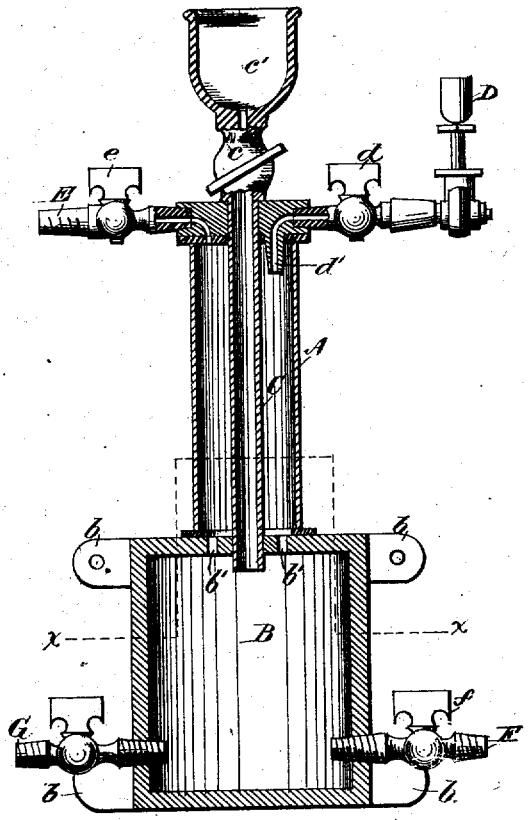
Figure 2:
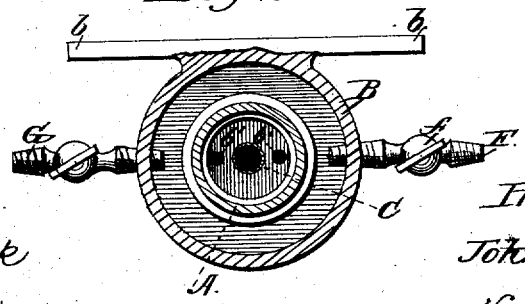

In the drawings, Figure 1 represents a central sectional elevation of the improved lubricator by means of which my method is carried practically into effect, and Fig. 2 a horizontal section of the same, taken on the line *x x*, Fig. 1.

To enable others skilled in the art to understand my method and to make and use my improved lubricator for carrying it practically into effect, I will proceed fully to describe them both.

In the drawings, A represents a hollow glass cylinder, of any proper size, which is provided with any suitable means of attachment to any proper support.

B represents a metallic vessel, provided with securing-brackets *b b*, which may, if desired, be secured to the base of cylinder A, as shown, as a convenient means of supporting the same. *b′ b′* represent openings in the top plate of the vessel B, which communicate with the cylinder A, and, in fact, unite the two to serve as one.

C represents a pipe, provided with a cock, *c*, and a filling cup, *c′*, by means of which the cylinder, when necessary, is supplied with oil.

D represents a pipe leading from the steam-boiler or any other water-supply higher than the oil, into the top of cylinder A. *d* represents a cock, by means of which the flow of water from the column in pipe D is regulated to determine the rate of feed. *d′* represents a projecting nipple, by means of which the water, when entering the oil, is discharged in the form of drops at a point removed from the sides of the cylinder.

E represents the discharge-pipe, having a regulating-cock, *e*, by means of which the oil expelled by the inflow of water is conveyed away to the place to be lubricated.

F represents a pipe, attached by a branch to the water-column, by means of which the water may be admitted to the bottom of the vessel when it is desired to feed the oil with greater rapidity. *f* represents a cock, by means of which the admission of water is controlled.

G represents a waste-pipe, having a proper cock, *g*, by means of which the water accumulating in the vessel may be drawn off when it is desired to refill with oil.

The method of using my improved lubricator is as follows: The cylinder having been properly provided with oil and the cock *e* opened, the lubricator is set to work by opening the cock *d*, by which means water is admitted from the water-column higher than the oil, and an equal amount of the latter, of course, expelled from the top of the cylinder through the discharge-pipe.

It will be understood that the pipe D, when connected with the steam-boiler, or other steam-space connected therewith, furnishes, by condensation, a column of water of sufficient height and weight to raise the oil the proper distance and discharge the same without reliance upon the steam-pressure.

The water may be admitted into the lubricator through the lower pipe when it is desired to feed with greater rapidity, in which case the water may be seen rising under the oil in vessel A, and be regulated accordingly, but for very slow feeding it may be admitted through the pipe at the top, and caused to fall through the oil in drops. As the drops can be readily seen through the glass cylinder the rate of feed, of course, may be easily known, and the same regulated according to the circumstances of the case by adjusting the cock *a'*. When the oil is all expelled the water may be drawn off through the waste-pipe G, and the cylinder refilled.

Having thus fully described my invention, what I claim as new, and desire to secure by Letters Patent, is—

1. The described method of feeding oil for lubricating purposes, consisting essentially in employing a water-column higher than the oil, causing the same to expel, by hydrostatic pressure, the oil from a transparent vessel, and controlling the movement of the water-column in accordance with observations made of the movement of the oil within the vessel, substantially as described.

2. The described method of feeding oil for lubricating purposes, consisting essentially in employing a column of water for expelling, by hydrostatic pressure, the oil, delivering the water to the top of the oil in a transparent vessel, causing the same to pass through the oil in drops, and controlling the amount admitted, substantially as described.

3. A lubricator, consisting of the following elements: a transparent oil-reservoir, an eduction-pipe, and an elevated induction water-pipe, having a cock controlling its discharge-opening, the construction being such that the movement of the oil within the reservoir may be observed, and the rate of feed consequently properly controlled, substantially as described.

4. A lubricator, consisting of the following elements: a transparent oil-reservoir, an eduction-pipe, and an elevated induction water-pipe, adapted, by means of a proper cock and discharge end, to deliver the water into the top of the reservoir in drops, substantially as described.

This specification signed and witnessed this 30th day of August, 1876.

JOHN GATES.

Witnesses:
JOSEPH SIMON.
J. N. DOLPH.